(12) United States Patent
Zinner (10) Patent No.: US 9,960,870 B2
(45) Date of Patent: May 1, 2018

(54) METHOD AND DEVICE FOR DATA TRANSFER IN A COMPUTER NETWORK FOR IDENTIFYING A SYNCHRONICITY BETWEEN A NODE OF THE COMPUTER NETWORK WITH AN ELEMENT OF THE COMPUTER NETWORK

(71) Applicant: Robert Bosch GmbH, Stuttgart (DE)

(72) Inventor: Helge Zinner, Magdeburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 182 days.

(21) Appl. No.: 15/066,859

(22) Filed: Mar. 10, 2016

(65) Prior Publication Data
US 2016/0294497 A1    Oct. 6, 2016

(30) Foreign Application Priority Data

Apr. 2, 2015  (DE) .................. 10 2015 206 051

(51) Int. Cl.
| | |
|---|---|
| *H04J 3/06* | (2006.01) |
| *H04L 12/28* | (2006.01) |
| *H04L 12/40* | (2006.01) |
| *G06F 1/14* | (2006.01) |

(52) U.S. Cl.
CPC .............. *H04J 3/0635* (2013.01); *G06F 1/14* (2013.01); *H04J 3/0658* (2013.01); *H04L 12/28* (2013.01); *H04L 12/40202* (2013.01)

(58) Field of Classification Search
CPC ....... H04J 3/0635; H04J 3/0658; H04L 12/28; H04L 12/40202; G06F 1/14
See application file for complete search history.

(56) References Cited

U.S. PATENT DOCUMENTS

| | | | | |
|---|---|---|---|---|
| 2015/0046742 | A1* | 2/2015 | Hata ................... | G06F 11/3604 713/502 |
| 2015/0333899 | A1* | 11/2015 | Nobauer ............... | H04J 3/0632 370/503 |
| 2016/0191597 | A1* | 6/2016 | Joy ....................... | H04L 65/608 709/231 |
| 2017/0084179 | A1* | 3/2017 | Chen .................... | B62D 15/025 |

* cited by examiner

*Primary Examiner* — Ayaz Sheikh
*Assistant Examiner* — Hai-Chang Hsiung
(74) *Attorney, Agent, or Firm* — Norton Rose Fulbright US LLP; Gerard Messina (57) ABSTRACT

A method and a correspondingly designed device for data transfer in a computer network, the method including transmitting a first message addressed by a first node of the computer network to a second node of the computer network for requesting information regarding the synchronicity of the second node with an element of the computer network, receiving a second message addressed by the second node of the computer network to the first node of the computer network with information regarding the synchronicity of the second node with the element, and ascertaining a status of the synchronization of the second node with the element with the aid of the received information.

10 Claims, 3 Drawing Sheets

Figure 4:
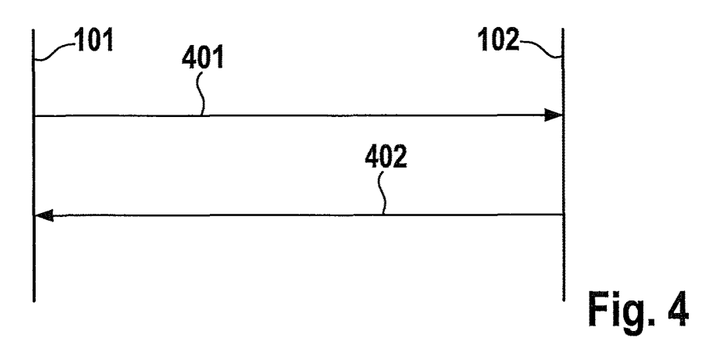
FIG. 4 shows a first signal flow chart.

Fig. 6 ated signal flow for transmitting and receiving messages is described below using the example of FIG. 4.

METHOD AND DEVICE FOR DATA TRANSFER IN A COMPUTER NETWORK FOR IDENTIFYING A SYNCHRONICITY BETWEEN A NODE OF THE COMPUTER NETWORK WITH AN ELEMENT OF THE COMPUTER NETWORK

CROSS REFERENCE

The present application claims the benefit under 35 U.S.C. § 119 of German Patent Application No. 102015206051.9 filed on Apr. 2, 2015, which is expressly incorporated by reference in its entirety.

BACKGROUND INFORMATION

The data transfer in a computer network takes place, for example, with the aid of protocols, such as the Internet protocol. Wired computer networks, for example, use the Ethernet, which facilitates the data exchange in the form of frames, so-called data frames, between the devices connected in a local area network (LAN).

Time synchronization protocols, for example, the Precision Time Protocol (PTP) according to IEEE 1588 or the generalized Precision Time Protocol (gPTP) according to IEEE 802.1 AS facilitate the exchange of time information between nodes of the computer network.

However, this exchange does not provide any information about the status of the synchronization between the individual nodes of the computer network itself.

SUMMARY

An example method in accordance with the present invention may have an advantage in that the status of the synchronization in the network is identified. In this way, a requesting node of the computer network may improve the synchronization accuracy and trigger time-controlled actions.

The example device, the example computer program and the example machine-readable memory medium in accordance with the present invention may have the same advantage.

An exemplary embodiment is shown in the figures and explained in greater detail below.

DETAILED DESCRIPTION OF EXAMPLE EMBODIMENTS

Figure 1:
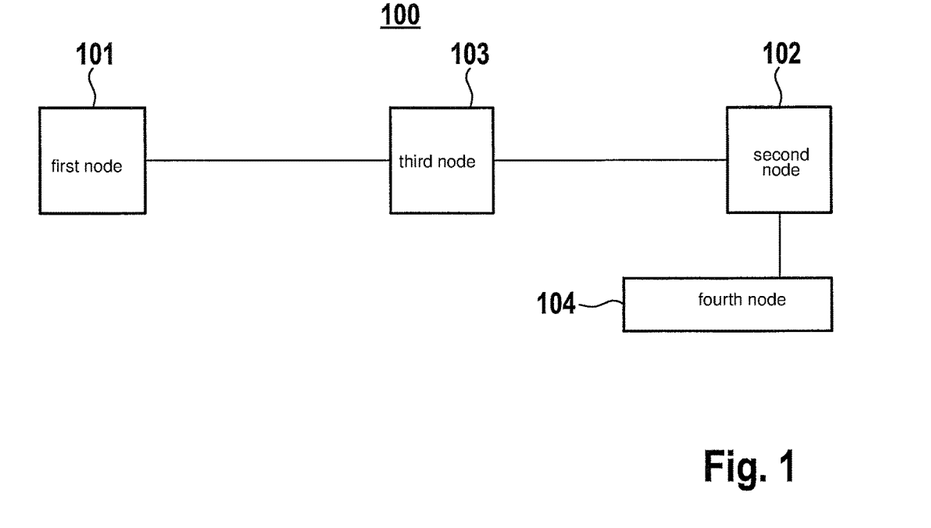
FIG. 1 schematically shows a part of a computer network.

FIG. 1 schematically shows a part of a computer network 100. Computer network 100 includes a first node 101 and a second node 102.

Figure 2:
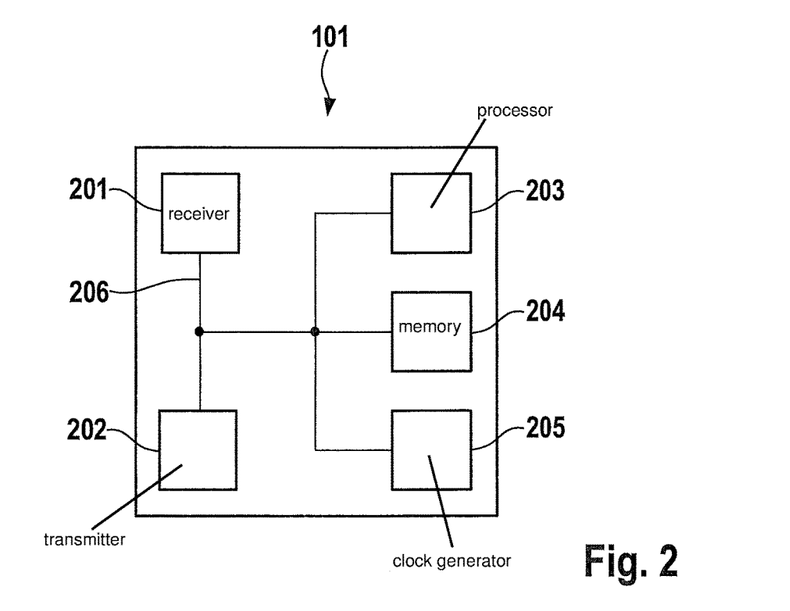
FIG. 2 schematically shows the configuration of a node of the computer network.

First node 101 is configured as schematically depicted in FIG. 2. Second node 102 is, for example, configured identically. Second node 102 may also be differently configured as long as the functionality of second node 102 described below is maintained.

First node 101 includes a receiver 201, a transmitter 202, a processor 203, a memory 204 and a clock generator 205.

Clock generator 205, also referred to below as quartz 205, is, for example, a quartz oscillator. A ceramic resonator or a MEMS oscillator may also be provided as clock generator 205.

Processor 203 cooperates with quartz 205, in order to trigger an interrupt after a defined number of oscillations of quartz 205. The interrupt is used as a clock pulse of one clock of first node 101, implemented in software, for example. Processor 203 and quartz 205 act as timers of first node 101.

First node 101 and second node 102 are connected via a data link. In the example of FIG. 1, the nodes are connected via a third node 103, for example, a bridge. Second node 102 is also connected to a fourth node 104 via an additional data link. The data links are depicted as solid lines connecting the respective nodes. Data are exchanged, as described below, via the data link, for example, with the aid of the Internet protocol and/or the Ethernet protocol.

Fourth node 104, like first node 101, is an element of computer network 100.

Fourth node 104 is connected, for example, to a bus system (not depicted). Second node 102 may also be directly connected to a bus system (not depicted). The bus system is, for example, a FlexRay or CAN bus.

Fourth node 104 or second node 102 may be designed to synchronize with the bus system. In addition, it may be provided that these nodes record information about the status of their synchronization with the bus system according to a time synchronization protocol. This information may be output in messages, as described below using the example of transmitter 202 and receiver 201 of first node 101.

Transmitter 202 and receiver 201 cooperate with processor 203, in order to transmit or receive messages.

A protocol for wired networks, for example, Ethernet, is used as a protocol in the physical layer for transmitting the messages. A Transmission Control Protocol (TCP)/Internet Protocol (IP) protocol stack or an AppleTalk Protocol Stack, for example, is used in the transport layer and/or the network layer. A wireless network protocol, such as the Wireless Local Area Network, for example, according to the IEEE 802.11 standard, may also be used. An Ethernet protocol, in particular, Ethernet Version II, Ethernet Audio/Video Bridging (AVB) or Ethernet Time Sensitive Networking (TSN), is preferably used.

In addition, transmitter 202, receiver 201 and processor 203 are also designed for cooperating with a second clock, for example, of second node 102, for synchronizing the clock of first node 101. For this purpose, for example, a time synchronization protocol, in particular, Ethernet Audio/Video Bridging (AVB) or Ethernet Time Sensitive Networking (TSN) or the Precision Time Protocol (PTP) according to IEEE1588 or IEEE802.1 AS is used.

Figure 3:
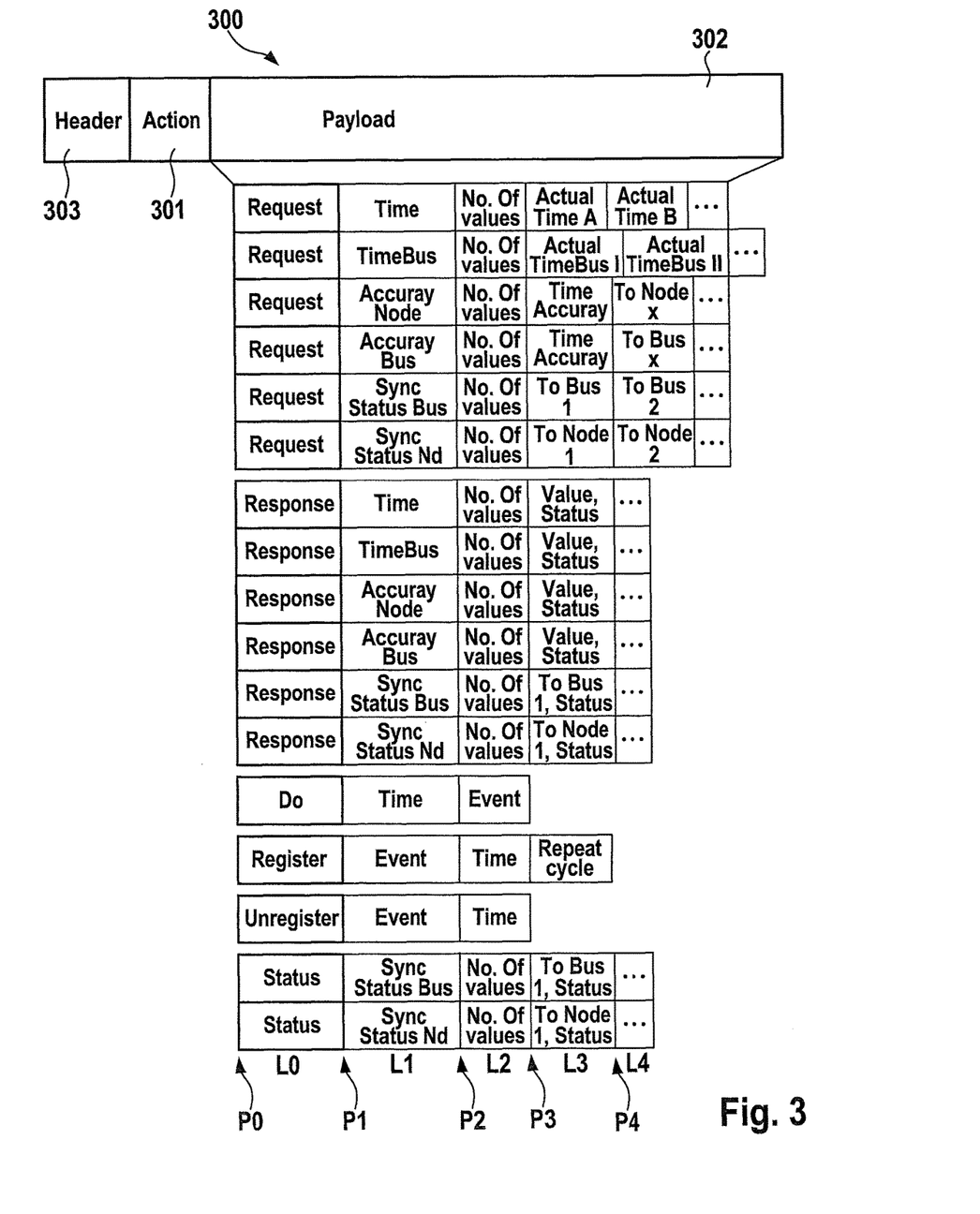
FIG. 3 schematically shows the configuration of a frame.

Transmitter 202 and a corresponding receiver of second node 102, as well as a transmitter of second node 102 corresponding to receiver 201 also cooperate, in order to convey messages according to the configuration depicted in FIG. 3.

Fourth node 104 may also be designed to transmit and receive these messages.

FIG. 3 schematically depicts the configuration of a frame 300 of a message. Such a message may be transmitted by transmitter 202 according to a predefined protocol. Receiver 201 may receive such a message. The corresponding transmitter and receiver of second node 102 or of fourth node 104 are also designed for transmitting or receiving such messages.

Frame 300 includes a header 303 and payload data of the predefined protocol. The payload data of the predefined protocol in the example include a field 301 and an additional field 302. The payload data may also be differently organized, for example, additional fields may be included.

Header 303 includes, according to the predefined protocol, for example, information about a sender address, a receiving address, a protocol type of the payload data and/or the length of the header. This information may differ depending on the predefined protocol. In the example, an Ethernet header is used.

Field 301 and additional field 302 are organized according to a configuration described below and referred to as a subprotocol.

Frame 300 is an Ethernet frame, for example, which is conveyed in an Ethernet packet. In this case, the Ethernet header includes the destination Media Access Control (MAC) address and the source MAC address. The nodes of computer network 100 are provided with MAC addresses accordingly.

The protocol type of the subprotocol is a distinctive designation. In the example, a type designation stored in the EtherType field is assigned to the subprotocol. The nodes of computer network 100 are designed for identifying this type designation and to characterize and interpret the payload data of the predefined protocol accordingly.

One message according to the subprotocol in this case includes payload data with information about an action relating to
- an instruction for an action to be carried out by second node 102,
- a status of an action to be carried out by second node 102 at the instruction of first node 101, or
- a result of an action carried out by second node 102 at the instruction of first node 101.

Here, the position of field 301 in the frame is predefined by the subprotocol. Predefined field 301, as depicted in FIG. 3, includes a first data word of a predefined bit length L0 at predefined position P0, the first data word including information about the action. The first data word, for example, has the same length as field 301.

By way of example, the content of the data word in FIG. 3 is expressed by the words "Request", "Response", "Do", "Register", "Unregister", "Status". These actions may likewise be depicted as numerical values, for example, with the aid of unique identification values.

In frame 300, additional field 302 is predefined by the subprotocol. Predefined additional field 302 includes at least one additional data word of a predefined bit length L1, L2, L3, L4 at an additional predefined position P1, P2, P3, P4, with additional information:
- about an inquiry regarding a time, or
- about an inquiry regarding a bus time, or
- about an inquiry regarding an accuracy of a synchronization between two nodes, or
- about an inquiry regarding an accuracy of a synchronization between a node connected to a bus system and the bus system itself, or
- about an inquiry regarding the status of a synchronization between two nodes, or
- about an inquiry regarding the status of a synchronization between a node connected to a bus system and the bus system itself, or
- about a response regarding a time, or
- about a response regarding a bus time, or
- about a response regarding an accuracy of a synchronization between two nodes, or
- about a response regarding an accuracy of a synchronization between a node connected to a bus system and the bus system itself, or
- about a response regarding a status of a synchronization between two nodes, or
- about a response regarding a status of a synchronization between a node connected to a bus system and the bus system itself, or
- about a particular point in time, at which an action is to be triggered by a node, or
- for registering a node as a receiver of a message by another node, or
- for deregistering a node previously registered by a node as a receiver of a message, or
- about a predefinable event, with the occurrence of which a message is to be transmitted by a node, or
- about a point in time after which a message is to be transmitted by a node, or
- about a clock pulse, in which a message is to be repeatedly transmitted by a node, or
- about a status of the synchronization between a node connected to a bus system and the bus system itself, or
- about a status of the synchronization between two nodes.

Queries are referred to as "Request" in FIG. 3. Answers are referred to as "Response" in FIG. 3. The content of the additional data words is a function of the action to which they are assigned.

The request regarding the clock time, as depicted in FIG. 3, is conveyed, for example, in the additional data word identified as "Time" as payload data for the action "Request". The additional data word "Time" may, for example, include the word "time".

Upon receipt of the word "time", the instantaneous internal clock time of the receiving node in this case is written as the result, for example, as a numerical value, into the additional data word identified as "Time". The result of the request is conveyed, for example, in the additional data word "Time", to which the action "Response" is assigned.

Thus, from a particular system, it is possible, for example, to query the global time, the global positioning system (GPS) or application time of a node connected in computer network 100.

For the other requests, the results in the example are also conveyed in the associated additional data word as payload data of the respective "Response".

The request or response regarding the bus time, for example, is conveyed in the additional data word designated "TimeBus". Thus, the bus time of multiple busses, such as a FlexRay and an Ethernet AVB bus, may be queried when they are connected to one node.

The request or response regarding the accuracy of the synchronicity with another element of the computer network is conveyed, for example, in the additional data word designated "Accuracy Node". Thus, the accuracy itself of a particular node relative to the node transmitting the inquiry may be queried.

The request or response regarding the accuracy of the synchronicity with a bus is conveyed, for example, in the additional data word designated "Accuray Bus". Thus, the accuracy of the synchronicity of the bus with the questioned node may be queried.

The request or response whether synchronicity with a particular bus is already achieved is conveyed, for example, in the additional data word designated "Sync Status Bus".

Thus, it may be queried whether synchronicity of the bus with the questioned node is already achieved.

The request or response to whether synchronicity with a particular node is already achieved is conveyed, for example, in the additional data word designated "Sync Status Nd". Thus, it may be queried whether synchronicity with the best clock time in computer network 100 is achieved. The best clock time in computer 100 is ascertained, for example, with the aid of the time synchronization protocol and the clock time thereof is transmitted with the aid of the time synchronization protocol.

This request or response may also concern the question whether synchronicity of the particular node with the questioned node is already achieved. In the case of an inquiry by first node 101 to second node 102, the particular node may be fourth node 104 or first node 101.

As a response, a requested node may, for example, convey a status about the request. In this case, the additional data word designated "Status" in FIG. 3 defines, for example, conditions such as error, synchronicity achieved, synchronicity discontinued, synchronization still ongoing.

Via the action designated "Do" in FIG. 3, one node may trigger an action at another node at a particular point in time. For example, a node may request a specific value at a particular time or with the occurrence of a particular event. The time may lie in the future. The time is conveyed, for example, in the additional data word designated "Time". The event is conveyed, for example, in the additional data word designated "Event". In this way, it is possible in the case of a sensor fusion at a temperature sensor, for example, to request a future value, for example in 30 seconds.

One node may be registered at another node via the function designated "Register" in FIG. 3. A registered node may receive a message with the occurrence of an event, which is conveyed in the data word designated "Event". In the additional data words designated "Time" and "Repeat cycle", a start time and a repetition frequency may be indicated for the transmission of the message.

One node may be deregistered at another node via the action designated "Unregister" in FIG. 3. The time for the deregistration is conveyed, for example, in the additional data word designated "Time". The event for the deregistration or in which the deregistration is to take place is conveyed in the additional data word designated "Event".

It may be provided that both the request for registration and for deregistration are confirmed by the respective receiving node.

A message with the action designated "Status" in the data word is supplied, for example, at the registered point in time to registered receivers, or when the registered event occurs. The additional data words designated "Sync Status Bus" or "Sync Status Nd" include, for example, information about the synchronicity with the bus or node. Thus, for example, a piece of information that synchronicity with the respective element of computer network 100 is achieved or has been lost, may be conveyed.

In addition, additional data words are provided as indicated in FIG. 3. An additional data word designated "No of Values" starting at position P2 includes, for example, information about the number of the additional data words that follow. For this purpose, an integer value, for example, is conveyed.

The additional data word designated "Actual Time A", "Actual Time B", "Actual Time Bus I" or "Actual Time Bus II" is used, for example, for requesting the instantaneous time of the additional nodes or busses designated A or B, or Bus I or Bus II. For this purpose, the respective data word includes, for example, a text "Actual Time A", "Actual Time B", "Actual Time Bus I" or "Actual Time Bus II", A, B, Bus I or Bus II indicating the identification of the respective queried additional node or bus, for example, its MAC address or the MAC address of the node controlling the respective bus.

The additional data words designated "Time Accuray" and "To Node x" or "to Bus x" relate to the request regarding the accuracy of the synchronicity with the respective node or bus. The additional data word designated "Time Accuray" includes information about the time at the requesting node. The identification of the respective node or bus, for example, its MAC address or the MAC address of the node controlling the respective bus is designated by x.

The additional data words designated "To Bus 1" or "To Bus 2", or "To Node 1" or "To Node 2" include the identification of the respective bus or node, for example, the MAC address of the node or the MAC address of the node controlling the respective bus.

The additional data words designated "Value Status", "To Bus 1, Status" or "To Node 1 Status", include information about the respective status of the respective node or bus. For example, the MAC address of a node or the MAC address of the node controlling the respective bus is conveyed together with the information "synchronous", "not synchronous".

The number of additional data words in the example is flexible and is indicated in the additional data word "No. of values". In the same way, a fixed number of additional data words may be provided. In this case, the additional data word "NO OF values" may be omitted.

Instead of conveying text or numerical values in the additional data words, it is also possible to convey predefined, unique identifications of the content described above, known to each node involved.

In this case, the identification of the content is assigned to that of the content described above, for example, via stored assignment tables.

A first method for data transfer in computer network 100 is described below with reference to the signal flow chart from FIG. 4. The first method relates to a process, which in the example runs on first node 101 of computer network 100. The process is implemented as a computer program, for example, executable and storable on a machine-readable memory medium.

The first method includes the transmission of a first message 401. First message 401 includes frame 300. First message 401 is addressed, for example, by first node 101 of computer network 100 to a second node 102 of computer network 100. For this purpose, transmitter 202 uses the address of first node 101 as the sender address and the address of second node 102 as the receiving address, for example, in accordance with a predefined protocol. For example, an Ethernet frame is used. The corresponding MAC addresses are written, for example, into an Ethernet header in the Ethernet frame. In addition, transmitter 202 may also write the type of subprotocol into the EtherType or the corresponding field of the predefined protocol used.

In addition, field 301 is filled, for example, by transmitter 202, with a request for information regarding the synchronicity of second node 102 with an element 104, 101 of computer network 100. For this purpose, the data word designated "Request" in FIG. 3 and the data word designated "Sync Status Bus" or "Sync Status Nd" is filled with the corresponding information. In the example, the status of the synchronicity of second node 102 with first node 101 is to be determined. For this purpose, the additional data word designated "Sync Status Nd" is filled with the text "Sync Status Nd". In addition, the additional data word designated "To Node 1" is filled with information about the node for which the synchronization status is to be ascertained. In the example, the additional data word starting at position P3 is filled. For example, the data word for first node 101 is filled with its identification, for example, its MAC address.

The first method includes the receipt of a second message 402. Second message 402 is addressed, for example, by second node 102 to first node 101. Upon receipt, the subprotocol is identified based on the protocol type, and the analysis step described below for ascertaining a status of the synchronization is carried out.

The ascertainment of the status of the synchronization of second node 102 with element 104, 101 with the aid of the received information includes the evaluation of the received information.

The data word starting at position P0 is initially evaluated in order to identify which action is required by second message 402.

As a function thereof, the additional data word starting at position P1 is evaluated, in order to determine which content the additional data words starting at position P2 have.

In the example, second message 402 in the data word starting at position P0 includes information, which characterizes second message 402 as "Response". The data word of second message 402 starting at position P1 in the example characterizes the content as "Sync Status ND" as information regarding the synchronicity of two nodes. Based on the request in first message 401 or on the information conveyed by the transmitting node, for example, its MAC or sender address, this is identified as information regarding the synchronicity of second node 102 with element 104, 101. Thus, in the example, it is identified that second message 402 relates to the synchronicity between second node 102 and first node 101.

The additional data words starting at position P2 include, for example, a unique identification assigned to a status of the synchronization. For this purpose, a unique identification may be provided with the aid of a text, for example, "synchronous", "not synchronous", or of a numerical value, for example, 1 for synchronous or 2 for not synchronous.

The status assigned to the received information may also be ascertained from the content of one or multiple data word(s) or, for example, with the aid of a database search. For this purpose, the additional data words are evaluated.

It may be provided to convey the status to other nodes of the computer network via a status message.

A second method for data transfer in computer network 100 is described below with reference to the signal flow chart from FIG. 4. The second method relates to a process, which in the example runs on second node 102 of computer network 100. The process is implemented as a computer program, for example, executable and storable on a machine-readable memory medium.

The second method includes the receipt of first message 401. For example, a receiver of second node 102 corresponding to receiver 201 of first node 102 receives first message 401. In the example, first message 401 described in the first method, which relates to the synchronicity of second node 102 with first node 101, is received.

The second method includes the ascertainment of information regarding the synchronicity of second node 102 with element 104, 101 with the aid of the received information. For this purpose, a processor of second node 102 corresponding to processor 203 is designed, for example, to evaluate the information according to the predefined protocol and the subprotocol as described above.

Depending on the content of the data words, one of the actions is identified and carried out. In the example, information regarding the synchronicity of second node 102 with first node 101 is queried.

In the example, the status of the synchronicity with first node 101 is determined. For example, a status value is read from a memory. The status value is ascertained and stored, for example, through constant monitoring of the messages exchanged with the aid of the respective time synchronization protocol.

The second method also includes the transmission of second message 402 with information regarding the synchronicity of second node 102 with first node 101. The information regarding the synchronicity is transmitted, for example, by filling the data words according to the subprotocol in a packet of the predefined protocol and subsequent transmission of the packet. The Ethernet packet is designed accordingly, for example.

Instead of the synchronicity with first node 101, the synchronicity between fourth node 104, which is connected to a bus system, and the bus system itself, may also be queried. In general, therefore, the synchronicity of second node 102 with element 104, 101 of computer network 100 is queried.

Every other piece of information provided in the subprotocol may be queried with corresponding messages, evaluated and sent back, as for the first and second method.

Figure 5:
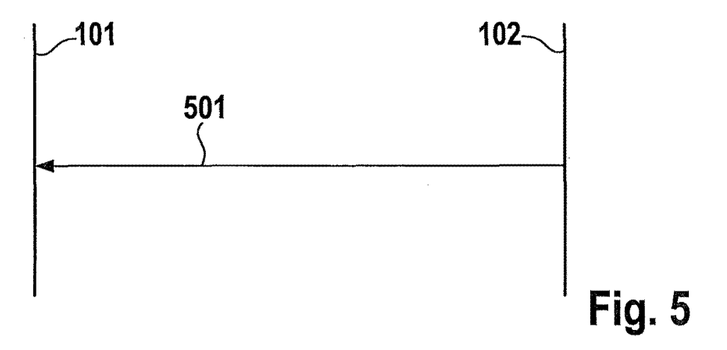
FIG. 5 shows a second signal flow chart.

FIG. 5 depicts a second signal flow chart. Depicted therein is a unidirectional communication relationship, in which an additional message 501 is conveyed by node 102 to first node 101. For example, additional message 501 is conveyed with the occurrence of a registered event or at a registered point in time. For this purpose, second node 102 monitors a condition regarding the event or the internal clock time and triggers the transmission of additional message 501.

Figure 6:
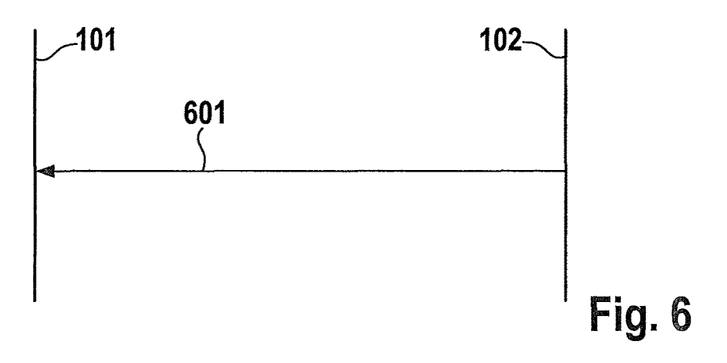
FIG. 6 shows a third signal flow chart.

FIG. 6 depicts a third signal flow chart. Depicted therein is a unidirectional communication relationship, in which an additional message 601 is conveyed by second node 102 to first node 101. For example, additional message 601 is transmitted for carrying out an action, for example, for registration or deregistration. A direct response is not provided in the example. In the case of the registration, it may be provided to transmit an additional message as confirmation.

The computer network is preferably at least part of a vehicle electrical system, in particular, of an automobile.

The computer network in the example includes a bridge. The nodes may also be directly connected.

It may also be provided that one or multiple of the following actions may be carried out in additional steps of the first method, as a function of the received second message 402.

Accuracy and start-up time, i.e., the time in which synchronicity is achieved, are monitored by conveying information regarding the status of the synchronization. Significant advantages with respect to the applicability and function arise, particularly in safety-critical applications, such as in vehicle control, as a result of the information for assessing the progress of the synchronization and information about the synchronization accuracy. This information may be distributed to control devices, for example, in the vehicle electrical system. For example, an additional message is transmitted to one or multiple of the nodes of the computer network. Alternatively or in addition, a function for controlling the vehicle is affected at the node of the node receiving second message 402.

In addition, it may be provided to compare the received status with a predefined status and, in the event they coincide, to increase the message frequency of the time synchronization protocol. In this way, the synchronization process may proceed in an accelerated manner. Thus, it is possible, for example to carry out real-time-critical actions in the computer network.

It may also be provided to reduce the message frequency of the time synchronization protocol in order to reduce the load of the bus, in the event the received status coincides with a predefined status.

It may be provided to preplan memories and resources and to dynamically carry out time controlled actions as a function of the received status. In this way, planned high-load conditions may be better managed.

The subprotocol in the example is written with data words of the same bit length. The bit length may also vary. Accordingly, one of the data words may contain information about the position or the length, as well as the number of the individual data words. Instead of two fields, multiple fields or only one field may be used.

What is claimed is:

1. A method for data transfer in a computer network comprising:
    transmitting a first message addressed by a first node of the computer network to a second node of the computer network for requesting information regarding a synchronicity of the second node with an element of the computer network;
    receiving a second message addressed by the second node of the computer network to the first node of the computer network with the information regarding the synchronicity of the second node with the element; and
    ascertaining a status of synchronization of the second node with the element based on the received information,
    wherein:
        the first message or the second message includes a frame of a predefined protocol;
        the frame includes a first predefined field at a first predefined position of the frame and a second predefined field at a second predefined position of the frame;
        the first predefined field includes a first data word (a) of a predefined bit length and (b) identifying an action to be carried out;
        the second predefined field includes at least one additional data word (a) of a respective predefined bit length and (b) that each includes a respective informational item of the information, the at least one respective informational item of the at least one additional data word including:
            (i) information about an inquiry or response regarding a time;
            (ii) information about an inquiry or response regarding a bus time;
            (iii) information about an inquiry or response regarding an accuracy of a synchronization between two nodes;
            (iv) information about an inquiry or response regarding an accuracy of a synchronization between a bus system and a node connected to the bus system;
            (v) information about an inquiry, response, or status regarding a status of a synchronization between two nodes;
            (vi) information about an inquiry, response, or status regarding a status of a synchronization between the bus system and a node connected to the bus system;
            (vii) information about a particular point in time at which an action is to be triggered by a node;
            (viii) information for registering or deregistering a node as a receiver of a message by another node;
            (ix) information about a predefinable event, with the occurrence of which a message is to be transmitted by a node;
            (x) information about a point in time after which a message is to be transmitted by a node;
            (xi) information about a clock pulse by which a message is to be repeatedly transmitted by a node; or
            a combination of two or more of (i)-(xi).

2. The method as recited in claim 1, wherein the element is one of the bus system, the node connected to a bus system, or the first node.

3. The method as recited in claim 1, wherein the first message or the second message includes an instruction for the second node to carry out the action or a status or a result of the action, which is to be carried out by the second node at the instruction of the first node.

4. The method as recited in claim 1, wherein the first and second messages are transmitted in a physical layer of the computer network using a protocol for wired data networks.

5. The method as recited in claim 4, wherein the protocol is an Ethernet protocol.

6. A method for data transfer in a computer network comprising:
    receiving a first message addressed by a first node of the computer network to a second node of the computer network, for requesting information regarding synchronicity of the second node of the computer network with an element of the computer network;
    ascertaining the information regarding the synchronicity of the second node with the element; and
    transmitting a second message addressed by the second node of the computer network to the first node of the computer network with the information regarding the synchronicity of the second node with the element;
    wherein:
        the first message or the second message includes a frame of a predefined protocol;
        the frame includes a first predefined field at a first predefined position of the frame and a second predefined field at a second predefined position of the frame;
        the first predefined field includes a first data word (a) of a predefined bit length and (b) identifying an action to be carried out;
        the second predefined field includes at least one additional data word (a) of a respective predefined bit length and (b) that each includes a respective informational item of the information, the at least one respective informational item of the at least one additional data word including:
            (i) information about an inquiry or response regarding a time;
            (ii) information about an inquiry or response regarding a bus time;

(iii) information about an inquiry or response regarding an accuracy of a synchronization between two nodes;
(iv) information about an inquiry or response regarding an accuracy of a synchronization between a bus system and a node connected to the bus system;
(v) information about an inquiry, response, or status regarding a status of a synchronization between two nodes;
(vi) information about an inquiry, response, or status regarding a status of a synchronization between the bus system and a node connected to the bus system;
(vii) information about a particular point in time at which an action is to be triggered by a node;
(viii) information for registering or deregistering a node as a receiver of a message by another node;
(ix) information about a predefinable event, with the occurrence of which a message is to be transmitted by a node;
(x) information about a point in time after which a message is to be transmitted by a node;
(xi) information about a clock pulse by which a message is to be repeatedly transmitted by a node; or
a combination of two or more of (i)-(xi).

7. The method as recited in claim 6, wherein the element is one of the bus system, the node connected to the bus system, or the first node.

8. The method as recited in claim 6, wherein the first message or the second message includes an instruction for the second node to carry out the action or a status or a result of the action, which is to be carried out by the second node at the instruction of the first node.

9. A device for data transfer in a computer network, which is configured to:
at least one of transmit and receive a first message addressed by a first node of the computer network to a second node of the computer network for requesting information regarding a synchronicity of the second node with an element of the computer network;
at least one of receive and transmit a second message addressed by the second node of the computer network to the first node of the computer network with the information regarding the synchronicity of the second node with the element; and
at least one of ascertain the information for transmission in the second message and ascertain a status of synchronization of the second node with the element based on the information in the second message after receipt of the second message;
wherein:
the first message or the second message includes a frame of a predefined protocol;
the frame includes a first predefined field at a first predefined position of the frame and a second predefined field at a second predefined position of the frame;
the first predefined field includes a first data word (a) of a predefined bit length and (b) identifying an action to be carried out;
the second predefined field includes at least one additional data word (a) of a respective predefined bit length and (b) that each includes a respective informational item of the information, the at least one respective informational item of the at least one additional data word including:
(i) information about an inquiry or response regarding a time;
(ii) information about an inquiry or response regarding a bus time;
(iii) information about an inquiry or response regarding an accuracy of a synchronization between two nodes;
(iv) information about an inquiry or response regarding an accuracy of a synchronization between a bus system and a node connected to the bus system;
(v) information about an inquiry, response, or status regarding a status of a synchronization between two nodes;
(vi) information about an inquiry, response, or status regarding a status of a synchronization between the bus system and a node connected to the bus system;
(vii) information about a particular point in time at which an action is to be triggered by a node;
(viii) information for registering or deregistering a node as a receiver of a message by another node;
(ix) information about a predefinable event, with the occurrence of which a message is to be transmitted by a node;
(x) information about a point in time after which a message is to be transmitted by a node;
(xi) information about a clock pulse by which a message is to be repeatedly transmitted by a node; or
a combination of two or more of (i)-(xi).

10. A non-transitory machine-readable memory medium accessible by a processor and on which are stored instructions that are executable by the processor and that, when executed by the processor, cause the processor to perform a method of data transfer in a computer network, the method comprising:
transmitting or receiving a first message addressed by a first node of the computer network to a second node of the computer network for requesting information regarding a synchronicity of the second node with an element of the computer network;
receiving or transmitting a second message addressed by the second node of the computer network to the first node of the computer network with the information regarding the synchronicity of the second node with the element; and
ascertaining the information for transmission in the second message or ascertaining a status of synchronization of the second node with the element based on the information in the second message after receipt of the second message;
wherein:
the first message or the second message includes a frame of a predefined protocol;
the frame includes a first predefined field at a first predefined position of the frame and a second predefined field at a second predefined position of the frame;
the first predefined field includes a first data word (a) of a predefined bit length and (b) identifying an action to be carried out;
the second predefined field includes at least one additional data word (a) of a respective predefined bit length and (b) that each includes a respective informational item of the information, the at least one respective informational item of the at least one additional data word including:

(i) information about an inquiry or response regarding a time;
(ii) information about an inquiry or response regarding a bus time;
(iii) information about an inquiry or response regarding an accuracy of a synchronization between two nodes;
(iv) information about an inquiry or response regarding an accuracy of a synchronization between a bus system and a node connected to the bus system;
(v) information about an inquiry, response, or status regarding a status of a synchronization between two nodes;
(vi) information about an inquiry, response, or status regarding a status of a synchronization between the bus system and a node connected to the bus system;
(vii) information about a particular point in time at which an action is to be triggered by a node;
(viii) information for registering or deregistering a node as a receiver of a message by another node;
(ix) information about a predefinable event, with the occurrence of which a message is to be transmitted by a node;
(x) information about a point in time after which a message is to be transmitted by a node;
(xi) information about a clock pulse by which a message is to be repeatedly transmitted by a node; or
a combination of two or more of (i)-(xi).

* * * * *